US008922805B2

(12) United States Patent
Utsumi

(10) Patent No.: US 8,922,805 B2
(45) Date of Patent: Dec. 30, 2014

(54) IMAGE PROCESSING APPARATUS HAVING UPDATABLE FIRMWARE, METHOD FOR CONTROLLING IMAGE PROCESSING APPARATUS, AND PROGRAM

(71) Applicant: Canon Kabushiki Kaisha, Tokyo (JP)

(72) Inventor: Keiko Utsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/097,613

(22) Filed: Dec. 5, 2013

(65) Prior Publication Data
US 2014/0160507 A1    Jun. 12, 2014

(30) Foreign Application Priority Data
Dec. 7, 2012   (JP) .................................. 2012-268495

(51) Int. Cl.
*G06F 3/12* (2006.01)
*H04N 1/00* (2006.01)

(52) U.S. Cl.
CPC .................................. *H04N 1/00962* (2013.01)
USPC ........................................................... 358/1.13

(58) Field of Classification Search
None
See application file for complete search history.

(56) References Cited

U.S. PATENT DOCUMENTS

| 2007/0055970 A1* | 3/2007 | Sakuda et al. ................. 717/168 |
| 2007/0080776 A1* | 4/2007 | Suwabe et al. ................. 340/5.2 |
| 2011/0279376 A1* | 11/2011 | Tang et al. .................... 345/169 |
| 2012/0272084 A1* | 10/2012 | Tsuji ............................ 713/324 |

FOREIGN PATENT DOCUMENTS

JP   2007-310783 A   11/2007

* cited by examiner

*Primary Examiner* — Jeremiah Bryar
(74) *Attorney, Agent, or Firm* — Canon USA Inc IP Division

(57) ABSTRACT

If a specified firmware subject to update is firmware of a sub control unit, an image processing apparatus updates the firmware of the sub control unit when a shifting condition for shifting from a first power mode to a second power mode has been satisfied. And the image processing apparatus shifts from the first power mode to the second power mode when the update of the firmware of the sub control unit has been completed.

11 Claims, 13 Drawing Sheets

FIG. 5

| | 511 | 512 | 513 |
|---|---|---|---|
| 501 | MAIN CONTROLLER BOARD | FIRMWARE-1 | 1.0 |
| 502 | MAIN CONTROLLER BOARD | FIRMWARE-2 | 1.0 |
| 503 | SUB CONTROLLER BOARD | FIRMWARE | 1.0 |
| 504 | SCANNER DEVICE | FIRMWARE | 1.0 |
| 505 | PRINTER DEVICE | FIRMWARE | 1.0 |

FIG. 7A

|  | 701 | 702 | 703 |
|---|---|---|---|
| 601 | MAIN CONTROLLER BOARD | FIRMWARE-1 | 1.1 |
| 602 | MAIN CONTROLLER BOARD | FIRMWARE-2 | 1.0 |
| 603 | SUB CONTROLLER BOARD | FIRMWARE | 1.0 |
| 604 | SCANNER DEVICE | FIRMWARE | 1.0 |
| 605 | PRINTER DEVICE | FIRMWARE | 1.0 |

FIG. 7B

|  | 711 | 712 | 713 |
|---|---|---|---|
| 611 | MAIN CONTROLLER BOARD | FIRMWARE-1 | 1.0 |
| 612 | MAIN CONTROLLER BOARD | FIRMWARE-2 | 1.0 |
| 613 | SUB CONTROLLER BOARD | FIRMWARE | 1.1 |
| 614 | SCANNER DEVICE | FIRMWARE | 1.0 |
| 615 | PRINTER DEVICE | FIRMWARE | 1.0 |

FIG. 7C

|     | 721 | 722 | 723 |
|-----|-----|-----|-----|
| 621 | MAIN CONTROLLER BOARD | FIRMWARE-1 | 1.1 |
| 622 | MAIN CONTROLLER BOARD | FIRMWARE-2 | 1.1 |
| 623 | SUB CONTROLLER BOARD | FIRMWARE | 1.1 |
| 624 | SCANNER DEVICE | FIRMWARE | 1.1 |
| 625 | PRINTER DEVICE | FIRMWARE | 1.1 |

FIG. 7D

| | 731 | 732 | 733 |
|---|---|---|---|
| 631 | MAIN CONTROLLER BOARD | FIRMWARE-1 | 1.1 |
| 632 | MAIN CONTROLLER BOARD | FIRMWARE-2 | 1.1 |

| | 741 | 742 | 743 |
|---|---|---|---|
| 633 | SUB CONTROLLER BOARD | FIRMWARE | 1.1 |
| 634 | SCANNER DEVICE | FIRMWARE | 1.1 |
| 635 | PRINTER DEVICE | FIRMWARE | 1.1 |

FIG. 7E

|  | 751 | 752 | 753 |
|---|---|---|---|
| 641 | MAIN CONTROLLER BOARD | FIRMWARE-1 | 1.0 |
| 642 | MAIN CONTROLLER BOARD | FIRMWARE-2 | 1.0 |
| 643 | SUB CONTROLLER BOARD | FIRMWARE | 1.0 |
| 644 | SCANNER DEVICE | FIRMWARE | 1.1 |
| 645 | PRINTER DEVICE | FIRMWARE | 1.0 |

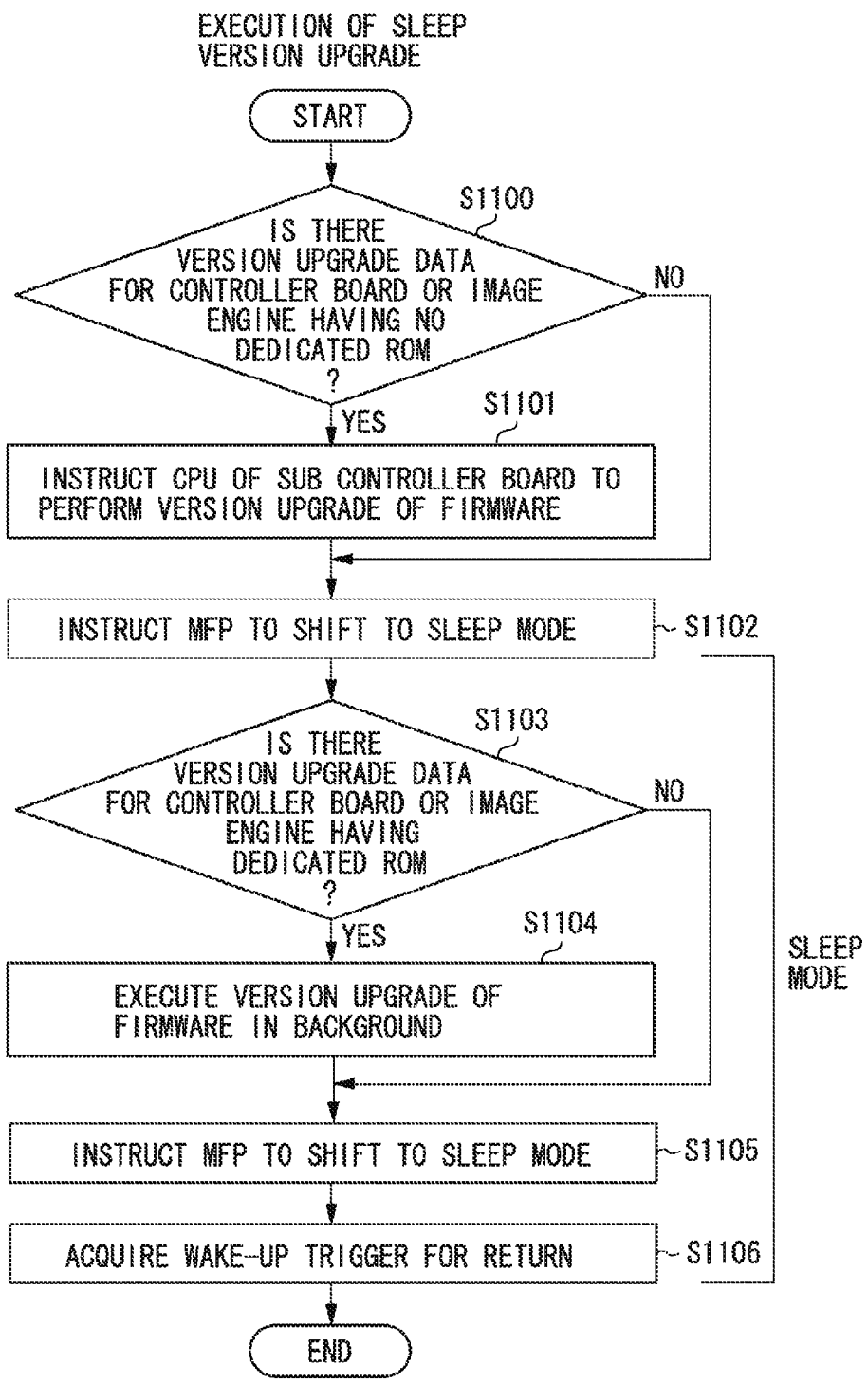

IMAGE PROCESSING APPARATUS HAVING UPDATABLE FIRMWARE, METHOD FOR CONTROLLING IMAGE PROCESSING APPARATUS, AND PROGRAM

BACKGROUND

1. Technical Field

The present disclosure relates to an image processing apparatus, a method for controlling the image processing apparatus, and a storage medium.

2. Description of the Related Art

In a conventional technique, a copying machine (hereinafter referred to as a multifunction peripheral (MFP)) cannot delete (overwrite) firmware that is being used by a system during the operation of the MFP. Thus, when performing a version upgrade of firmware, the MFP switches to a version-upgrade-only mode, in which the MFP does not cause normal firmware to operate. In the version-upgrade-only mode, the configuration of firmware to be started is completely different from the configuration of firmware to be started in a normal mode. Thus, it is necessary to restart the system at least once to switch modes. The MFP, however, cannot execute or receive a job during the restart because the system stops.

In the conventional technique, generally, a version upgrade of the system thus involves the time period in which the MFP cannot execute or receive a job, and therefore, the MFP notifies a user of this situation. Then, with understanding the situation, the user gives an instruction to perform the version upgrade. In such a version upgrade performed manually by the user, however, it is left to the user to determine the timing of the version upgrade. This prevents the immediate reflection of version upgrade data against a fatal failure of security.

In response, Japanese Patent Application Laid-Open No. 2007-310783 discusses a technique for which an MFP automatically executes setting of a version upgrade when the MFP has received new firmware in the background and entered a power saving mode and the MFP determines that it is a time when a user does not use the MFP. Further, Japanese Patent Application Laid-Open No. 2007-310783 discusses a technique for which the MFP automatically executes a restart to perform a system version upgrade process, if the time when the user does not use the MFP has continued and a time to shift to a sleep mode is reached.

As described above, the MFP can determine the time period in which the user is not using the MFP, and the MFP can automatically perform a version upgrade. The MFP, however, does not notify the user that the MFP cannot execute or receive a job because the version upgrade is being performed. Thus, the user may request the MFP to execute a job. At this time, the MFP cannot execute or receive the job and, therefore, an error status occurs. Thus, the user needs to request the MFP again to execute the job.

Further, the processing of the version upgrade and the restart executed to reflect information, which is subjected to the version upgrade, on the MFP require a certain time period. Consequently, the user cannot use the MFP for a certain time period.

SUMMARY

According to an aspect of the present invention, an image processing apparatus including a main control unit and a sub control unit includes a power control unit configured to control the image processing apparatus operating in either of a first power mode or a second power mode, wherein the main control unit is operative to receive a job transmitted from an external apparatus and power is supplied to the sub control unit in the first power mode, and the main control unit is operative to receive a job transmitted from an external apparatus and power is not supplied to the sub control unit in the second power mode, an update unit configured to update firmware of the image processing apparatus, a specifying unit configured to specify firmware subject to update, and a detection unit configured to detect in a case where a shifting condition for shifting from the first power mode to the second power mode is satisfied, wherein the update unit updates firmware of the sub control unit according to the detection unit having detected that the shifting condition is satisfied, if the firmware subject to update specified by the specifying unit is not firmware of the main control unit but firmware of the sub control unit, and wherein the power control unit causes the image processing apparatus to shift from the first power mode to the second power mode according to completion of the update of the firmware of the sub control unit performed by the update unit if the firmware subject to update specified by the specifying unit is not firmware of the main control unit but firmware of the sub control unit.

Further features of the present invention will become apparent from the following description of exemplary embodiments with reference to the attached drawings.

BRIEF DESCRIPTION OF THE DRAWINGS

FIG. 5 is a diagram illustrating examples of version information of each piece of firmware.

FIG. 7A is a diagram illustrating an example of version upgrade information in which only firmware of a main controller board is subjected to a version upgrade.

FIG. 7B is a diagram illustrating an example of version upgrade information in which only firmware of a sub controller board is subjected to a version upgrade.

FIG. 7C is a diagram illustrating an example of version upgrade information in which all pieces of firmware are subjected to version upgrades.

FIG. 7D is a diagram illustrating an example of version upgrade information in which pieces of firmware information of the main controller board are managed separately.

FIG. 7E is a diagram illustrating an example of version upgrade information in which only firmware of a scanner device is subjected to a version upgrade.

FIG. 8 is a flow chart illustrating an example of a version upgrade process of firmware in a sleep mode.

DESCRIPTION OF THE EMBODIMENTS

Various exemplary embodiments, features, and aspects of the invention will be described in detail below with reference to the drawings.

An MFP according to an exemplary embodiment of the present invention is described below.

Figure 1:
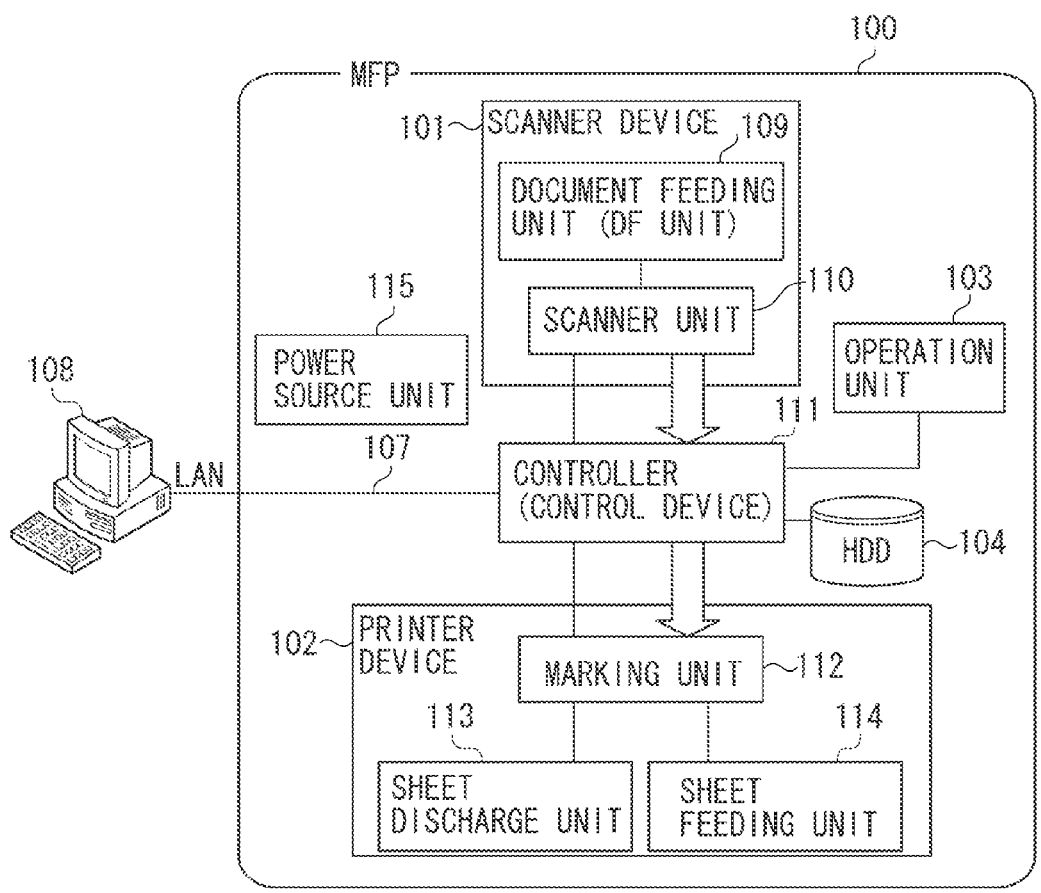
FIG. 1 is a diagram illustrating an example of a system configuration.

FIG. 1 is a diagram illustrating an example of a system configuration.

An MFP 100 includes a scanner device 101, which optically reads an image from a document and converts the image into a digital image, a printer device 102, which outputs the digital image to paper, and an operation unit 103, which is used to operate the MFP 100. The MFP 100 further includes a hard disk drive (HDD) 104, which stores a digital image and a control program, and a controller 111, which can execute a job on the MFP 100 by giving instructions to modules. The HDD 104 is an example of a storage unit. The MFP 100 can transmit and receive a digital image to and from a computer 108 and can receive a job or an instruction for a device from the computer 108 via the LAN or network 107. The computer 108 is an example of an information processing apparatus.

The scanner device 101 includes a document feeding unit 109, which can automatically and sequentially replace one sheet with another in a document bundle, and a scanner unit 110, which can optically scan a document and convert the scanned image into a digital image. The scanner device 101 transmits the converted image data to the controller 111.

The printer device 102 includes a sheet feeding unit 114, which can sequentially feed sheets one by one from a sheet bundle, a marking unit 112, which prints image data on the fed sheet, and a sheet discharge unit 113, which discharges the sheet after printing.

A power source unit 115 supplies power to the each component of the MFP 100. The wiring for the power supply is not described here.

Figure 2:
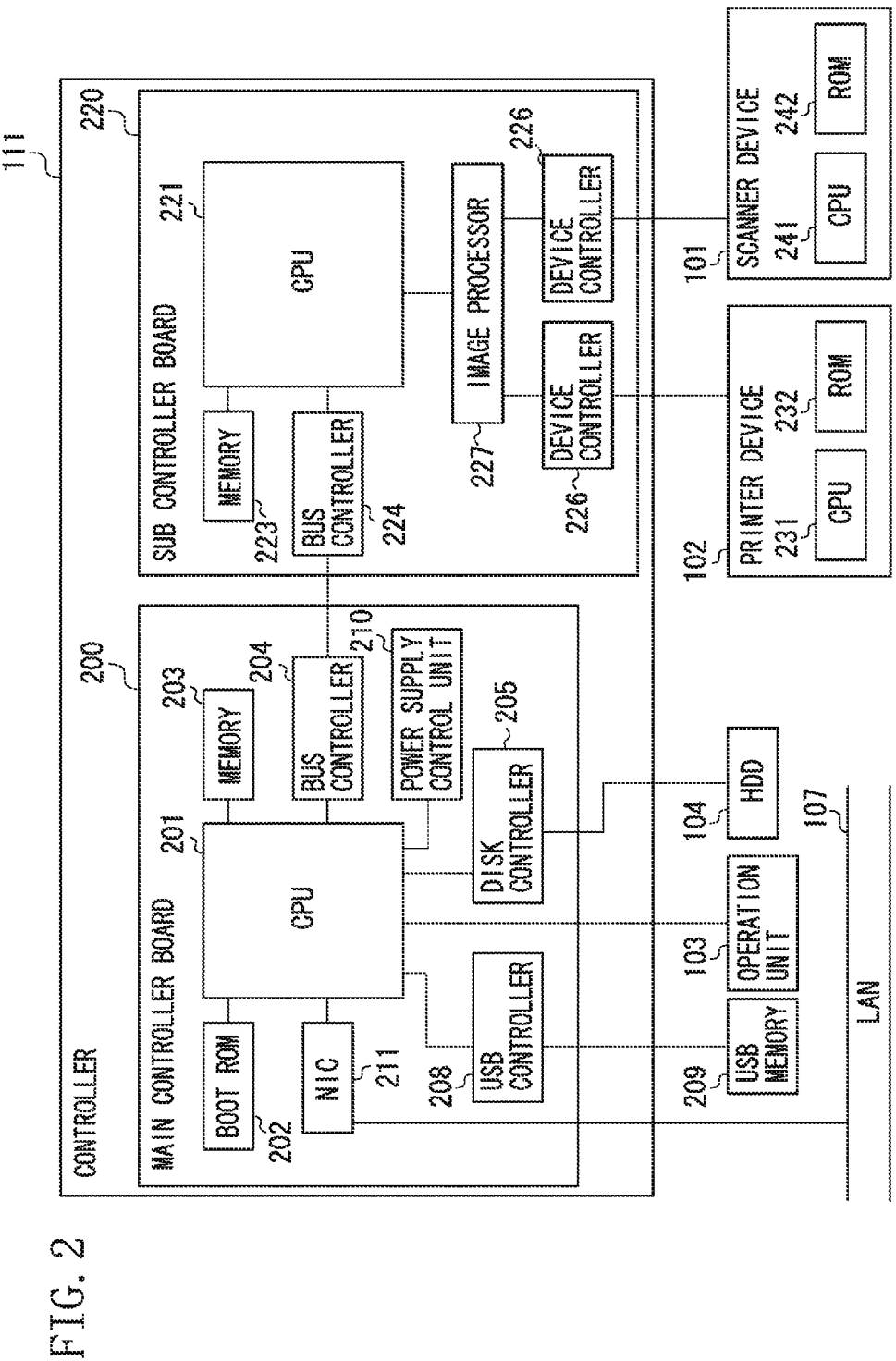
FIG. 2 is a diagram illustrating an example of the hardware configuration of a controller of an MFP.

FIG. 2 is a diagram illustrating an example of the hardware configuration of the controller 111 of the MFP 100.

With reference to FIG. 2, the controller 111 according to the present exemplary embodiment is described.

The controller 111 includes a main controller board 200 and a sub controller board 220.

The main controller board 200 is a so-called general-purpose central processing unit (CPU) system. The main controller board 200 includes a CPU 201, which controls the entire main controller board 200, a boot read-only memory (ROM) 202, which stores a boot program, a memory 203, which is used as a work memory by the CPU 201, and a bus controller 204, which has a bridge function between the main controller board 200 and an external bus. The main controller board 200 further includes, a disk controller 205, which controls a storage device, a Universal Serial Bus (USB) controller 208, which can control USB connection; and a network interface card (NIC) 211, which is used to connect to the LAN or network 107. The main controller board 200 further includes a power supply control unit 210, which controls the power source unit 115. The main controller board 200 is an example of a main control unit.

The CPU 201 executes a program stored in the boot ROM 202, a USB memory 209, or the HDD 104, thereby achieving functions (software configuration) of the MFP 100 and the processing according to flow charts described below.

The main controller board 200 is connected externally to the USB memory 209, the operation unit 103, and the HDD 104. The main controller board 200 is also connected to the LAN or network 107 via the NIC 211. The CPU 201 of the main controller board 200 can interactively exchange data with another network device and a file server and can receive a job (print job) transmitted from the computer 108.

The sub controller board 220 includes a relatively small general-purpose CPU system and image engines. The image engines according to the present exemplary embodiment include the printer device 102 and the scanner device 101. The sub controller board 220 includes a CPU 221, which controls the entire sub controller board 220, a memory 223, which is used as a work memory by the CPU 221, and a bus controller 224, which has a bride function between the sub controller board 220 and an external bus. The sub controller board 220 further includes an image processor 227, which performs real time digital image processing, and device controllers 226. The sub controller board 220 is an example of a sub control unit. The sub control unit may include the image engines.

The CPU 221 executes a program stored in the USB memory 209 or the HDD 104, thereby achieving functions (software configuration) of the MFP 100.

The external scanner device 101 and the external printer device 102 transmit and receive digital image data to and from the CPU 221 via the device controllers 226.

The printer device 102 includes a ROM 232, which is used to store firmware for causing the printer device 102 to operate, and a dedicated CPU 231, which executes the firmware.

The scanner device 101 includes a ROM 242, which is used to store firmware for causing the scanner device 101 to operate, and a dedicated CPU 241, which executes the firmware.

A sleep mode according to the present exemplary embodiment refers to the state where minimum power is being supplied allowing the MFP 100 to receive a job from the NIC 211 or the operation unit 103. Having received a job in the sleep mode, the MFP 100 returns to a normal starting state (hereinafter referred to as a normal mode) and executes the job. In the normal mode, power is being supplied to the entire MFP 100. In the sleep mode, power is being supplied to the NIC 211, the memory 203, and a part of the operation unit 103. The state of power supply in the sleep mode does not need to be limited to the above state and does not limit the present exemplary embodiment.

FIG. 2 is a simplified diagram of an example of the controller 111 according to the present exemplary embodiment. In practice, the CPU 201 and the CPU 221 each include many pieces of CPU peripheral hardware such as a chipset, a bus bridge, and a clock generator.

Figure 3:
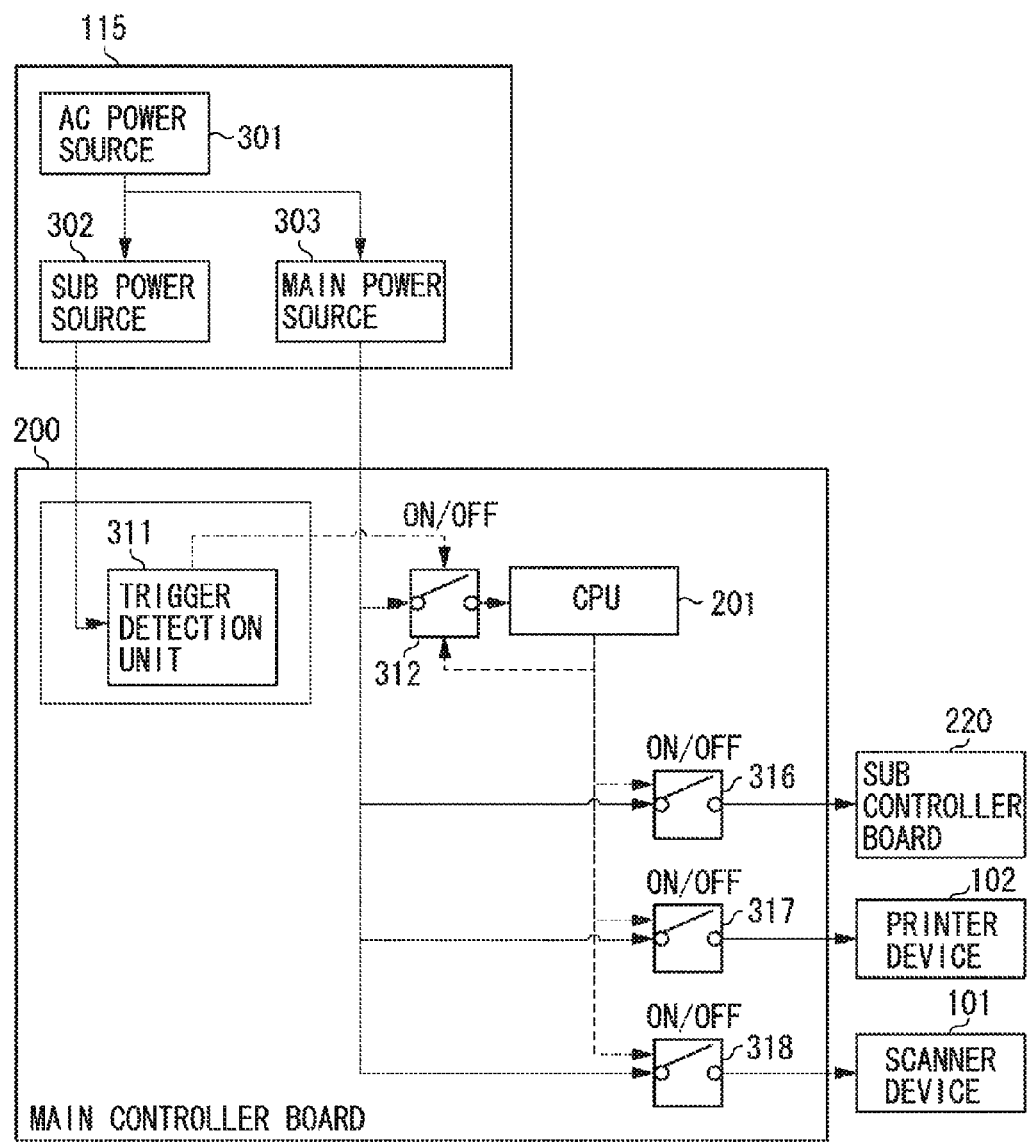
FIG. 3 is a diagram illustrating an example of the configuration for controlling power supply.

FIG. 3 is a diagram illustrating an example of the configuration for controlling power supply, according to the present exemplary embodiment.

In FIG. 3, solid arrows indicate power supply, and dotted arrows indicate the control of power supply.

The power source unit 115 includes an alternating current (AC) power source 301, a sub power source 302, and a main power source 303.

The AC power source 301 supplies power to the sub power source 302 and the main power source 303.

The sub power source 302 supplies power to a trigger detection unit 311.

The main power source 303 supplies power to the CPU 201 of the main controller board 200, the sub controller board 220, the printer device 102, and the scanner device 101 via on/off switching units 312, 316, 317, and 318, respectively. In the present exemplary embodiment, as illustrated in FIG. 2, the image engines are connected to the far end of the sub controller board 220. Thus, in the configuration illustrated in FIG. 3, to control the on/off switching units 317 and 318 so that power is supplied to the image engines, the CPU 201 needs to control the on/off switching unit 316 of the sub controller board 220 to be on. The configuration of power control, however, does not need to be limited to this. For example, the configuration may be such that power is supplied to the image engines not via the sub controller board 220. In this case, the CPU 201 can control the supply of power by controlling the on/off switching units 317 and 318 of the image engines, regardless of whether the on/off switching unit 316 of the sub controller board 220 is on or off.

The main power source 303 supplies power to each component of the MFP 100 and each component of the controller 111 as well via an on/off switching unit (not illustrated).

Next, as the power modes of the MFP 100 according to the present exemplary embodiment, the normal mode (a first power mode) and the sleep mode (a second power mode) are described. The MFP 100 can operate at least in either of the normal mode or the sleep mode.

In the normal mode, power is being supplied to each of the main controller board 200, the sub controller board 220, the printer device 102, and the scanner device 101. When causing the MFP 100 to shift to the sleep mode, the CPU 201 turns off the on/off switching units 312, 316, 317, and 318.

Although not illustrated, at this time, power is being supplied to the NIC 211, the memory 203, and a part of the operation unit 103 through other channels as described above. This enables the MFP 100 to return from the sleep mode using operations of the units that are being supplied with power as a trigger.

When the MFP 100 returns from the sleep mode, the trigger detection unit 311 detects and analyzes the input of data from the operation unit 103 or the NIC 211, and turns on the on/off switching unit 312. Further, the CPU 201 determines the switching of the on/off switching units 316, 317, and 318 of the sub controller board 220, the printer device 102, and the scanner device 101, respectively, and turns on the on/off switching units 316, 317, and 318.

The CPU 201 controls the switching of the on/off switching units 316, 317, and 318 also when version upgrades of the pieces of firmware of the main controller board 200, the sub controller board 220, the printer device 102, and the scanner device 101 are performed. The details will be described later with reference to FIGS. 6 and 8.

Figure 4A:
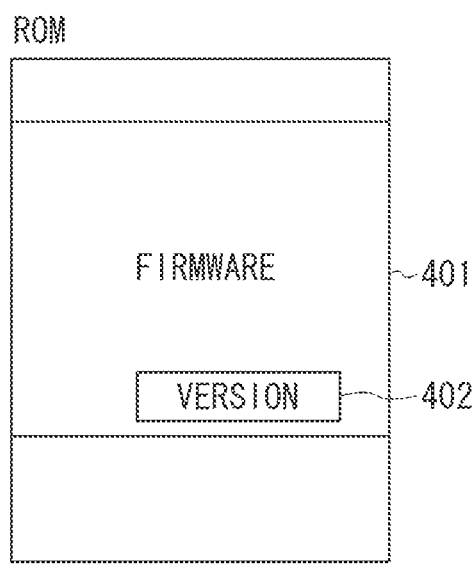
FIG. 4A is a diagram illustrating an example of the arrangement of firmware and version information in a ROM.

FIG. 4A is a diagram illustrating an example of the arrangement of firmware and version information in the storage area when the storage area of firmware is a dedicated storage area. In the present exemplary embodiment, the printer device 102 and the scanner device 101 correspond to the example.

Each of the ROMs 232 and 242 stores firmware 401 of the printer device 102 and the scanner device 101, respectively. In the firmware 401, version information 402 of the firmware 401 is stored.

The CPU 201 determines the necessity of a version upgrade, using the version information 402. The details of the determination process performed by the CPU 201 will be described later with reference to FIGS. 6 and 7A to 7E. Each of the CPUs 231 and 241 loads the firmware 401 of the printer device 102 and the scanner device 101, respectively, and performs a version upgrade of the firmware 401. In the present exemplary embodiment, a description is given taking a version upgrade as an example of the update of firmware. Alternatively, it is also possible to treat a version downgrade as the update of firmware in a similar manner to the present exemplary embodiment.

Figure 4B:
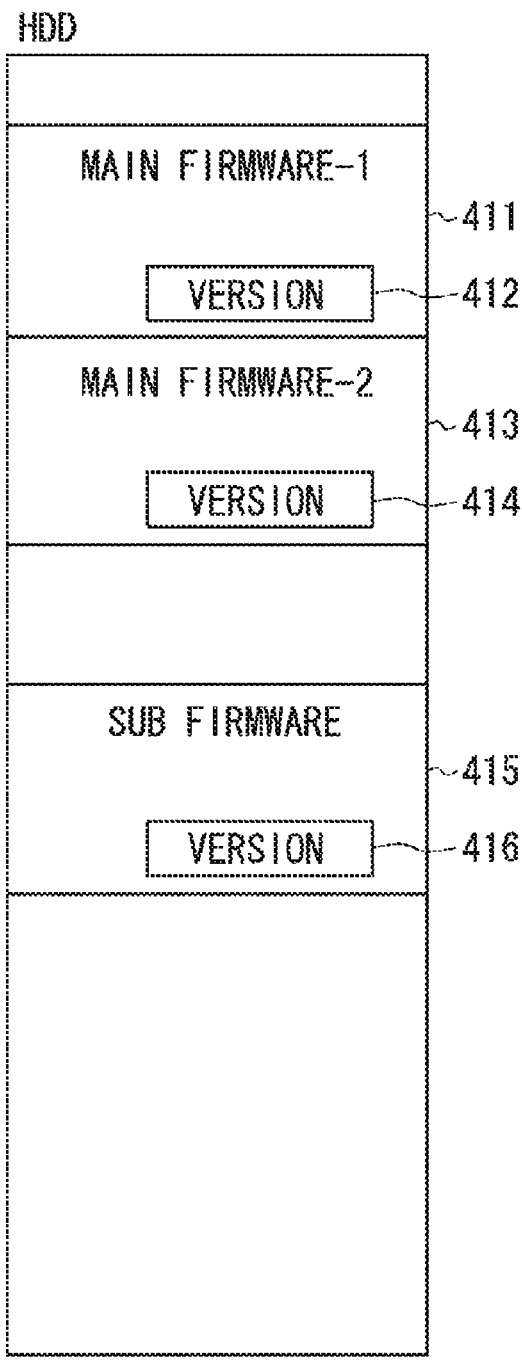
FIG. 4B is a diagram illustrating an example of the arrangement of firmware and version information in an HDD.

FIG. 4B is a diagram illustrating an example of the arrangement of firmware and version information in the storage area when the storage area of firmware is a shared storage area. In the present exemplary embodiment, the main controller board 200 and the sub controller board 220 are used as the example.

The HDD 104 stores pieces of firmware 411, 413, and 415 of the main controller board 200 and the sub controller board 220. Further, in each piece of firmware 411, 413, and 415, pieces of version information 412, 414, and 416 of the corresponding firmware are stored.

The CPU 201 determines the necessities of version upgrades using the pieces of version information 412, 414, and 416. The details of the determination process performed by the CPU 201 will be described later with reference to FIGS. 6 and 7A to 7E. Further, the CPU 201 loads and performs version upgrades of the pieces of firmware 411 and 413 of the main controller board 200. The CPU 221 loads and performs a version upgrade of the firmware 415 of the sub controller board 220. The CPU 221 performs a version upgrade of the firmware 415 transferred to the sub controller board 220 via the bus controller 224 by the CPU 201.

As illustrated in FIGS. 4A and 4B, each of the printer device 102, the scanner device 101, the main controller board 200, and the sub controller board 220 has one or more pieces of firmware.

FIG. 5 is a diagram illustrating an example of a table of the types of the pieces of firmware held by the main controller board 200, the sub controller board 220, the printer device 102, and the scanner device 101 according to the present exemplary embodiment, and the version information of the respective pieces of firmware. The version information illustrated in FIG. 5 is version information before the MFP 100 performs version upgrade of each piece of firmware.

A column 511 has the types of components, namely the main controller board 200, the sub controller board 220, the printer device 102, and the scanner device 101.

A column 512 has the types of the pieces of firmware.

A column 513 has the version information of the respective pieces of firmware.

Hereinafter, for example, firmware 501 means firmware corresponding to information of a row 501. The same applies to rows 502 to 505. In the present exemplary embodiment, five pieces of firmware 501 to 505 are required for the operation of the MFP 100.

Next, with reference to FIGS. 6, 7A, 7B, 7C, 7D, and 7E, a firmware version upgrade process performed by the MFP 100 is described.

Figure 6:
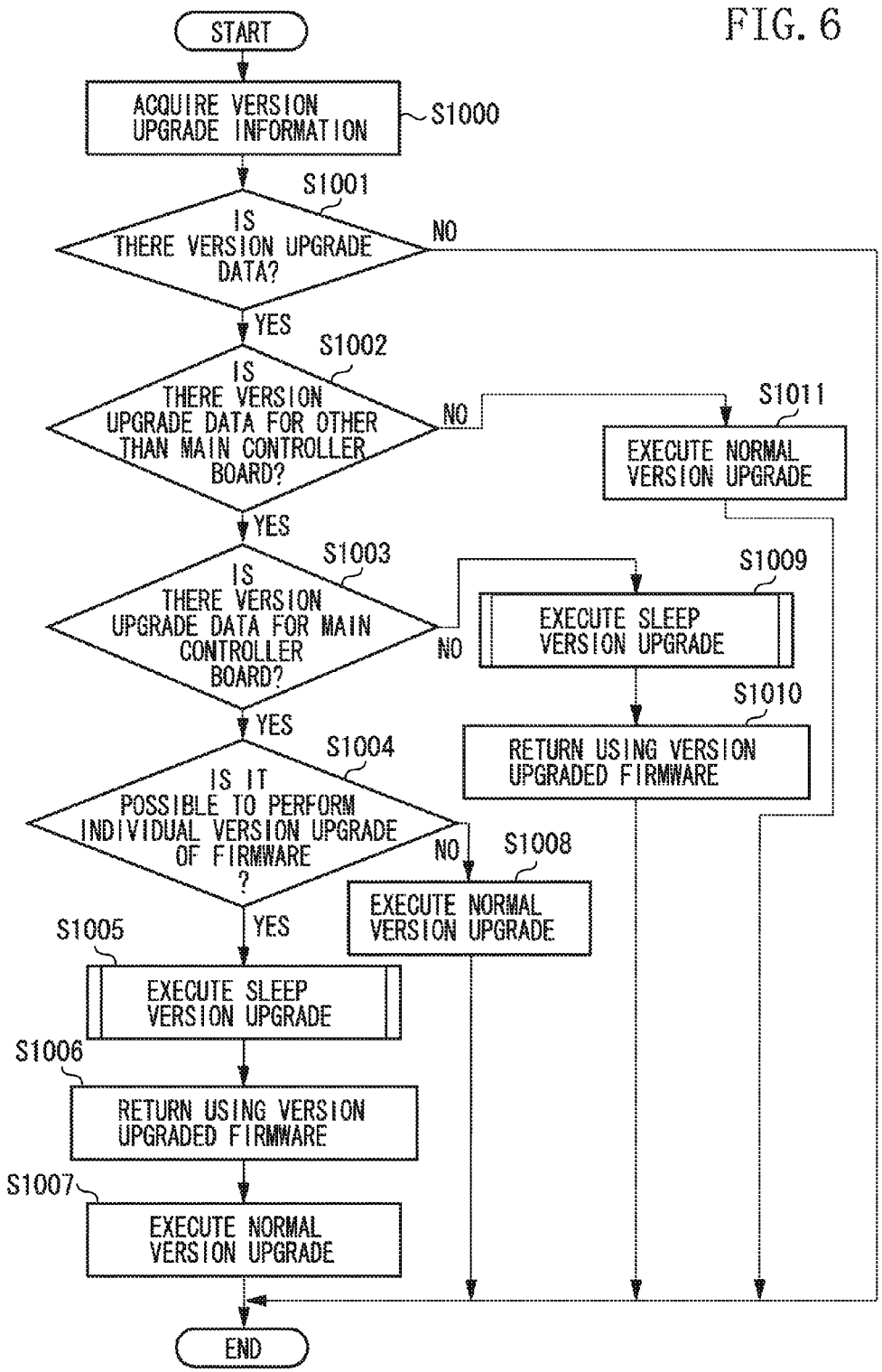
FIG. 6 is a flow chart illustrating an example of a version upgrade process of firmware.

FIG. 6 is a flow chart illustrating an example of the processing performed by the MFP 100 in a version upgrade of firmware.

In the processes of steps S1000 to S1011, processing related to control and determination is performed by the CPU 201 executing a boot program and firmware stored in advance in the boot ROM 202, the HDD 104, or the USB memory 209. The CPU 201 gives an instruction to execute a firmware version upgrade process. As described above, each of the CPUs 201, 221, 231, and 241 loads firmware and performs a version upgrade of the firmware.

FIG. 7A is a diagram illustrating an example of version upgrade information in which only firmware of the main controller board 200 is subjected to a version upgrade.

FIG. 7B is a diagram illustrating an example of version upgrade information in which only firmware of the sub controller board 220 is subjected to a version upgrade.

FIG. 7C is a diagram illustrating an example of version upgrade information in which all pieces of firmware are subjected to version upgrades.

FIG. 7D is a diagram illustrating an example of version upgrade information in which firmware information of the main controller board 200 are managed separately.

FIG. 7E is a diagram illustrating an example of version upgrade information in which only firmware of the scanner device 101 is subjected to a version upgrade.

For example, a column 701 has the types of components, namely the main controller board 200, the sub controller board 220, the printer device 102, and the scanner device 101.

For example, a column 702 has the types of the pieces of firmware.

For example, a column 703 has the pieces of version information of the respective pieces of firmware.

Hereinafter, for example, firmware 601 means firmware corresponding to information of a row 601. The same applies to all of FIGS. 7A to 7E.

In step S1000, the CPU 201 acquires version upgrade information as illustrated in FIGS. 7A to 7E, and the processing proceeds to step S1001. The CPU 201 uses the version upgrade information acquired in step S1000, as update information for specifying firmware to be updated. The CPU 201 executes the process of step S1000 in the background during the operation of the MFP 100. Further, the CPU 201 periodically executes the process of step S1000. The periodic intervals or the time at which the CPU 201 executes step S1000 are set in advance. The CPU 201 can change the periodic intervals or the time according to an input from a user received through the operation unit 103. Further, the CPU 201 may acquire the version upgrade information from the computer 108 or a management server apparatus via the LAN or network 107, or from the USB memory 209.

The version upgrade information acquired by the CPU 201 has the version information corresponding to each of the piece of firmware as illustrated in FIGS. 7A to 7E.

In step S1001, the CPU 201 determines whether there is version upgrade data based on the version upgrade information acquired in step S1000. If the CPU 201 has determined that there is version upgrade data, the processing proceeds to step S1002. If, on the other hand, the CPU 201 has determined in step S1001 that there is no version upgrade data, the processing ends.

More specifically, the CPU 201 compares current version information of the each firmware held by the CPU 201 (FIG. 5) with the version information of the corresponding firmware included in the version upgrade information acquired in step S1000 (FIG. 7A, 7B, 7C, 7D, or 7E). Then, if any one of the pieces of version information included in the version upgrade information is different from the current version information of the firmware, the CPU 201 determines that it is necessary to perform a version upgrade. The version upgrade data here refers to firmware, which is subjected to a version upgrade.

In step S1002, the CPU 201 determines whether there is version upgrade data for other than the main controller board 200. If the CPU 201 has determined that there is the version upgrade data, the processing proceeds to step S1003. If, on the other hand, the CPU 201 has determined in step S1002 that there is no version upgrade data, the processing proceeds to step S1011. In the present exemplary embodiment, the firmware of other than the main controller board 200 refers to the pieces of firmware 503, 504, and 505 of the sub controller board 220, the scanner device 101, and the printer device 102, respectively. The pieces of firmware 503, 504, and 505 are pieces of firmware before being subjected to version upgrades.

The process of step S1002 is described more specifically.

If the CPU 201 has acquired the version upgrade information in FIG. 7A, only the firmware 601 of the main controller board 200 is subjected to a version upgrade. In such a case, the CPU 201 determines that there is no version upgrade data for other than the main controller board 200. Alternatively, if the CPU 201 has acquired the version upgrade information illustrated in FIG. 7B, 7C, or 7D, the pieces of firmware 613, 623, 624, 625, 633, 634, and 635 are subjected to version upgrades. In such a case, the CPU 201 determines that there is version upgrade data for other than the main controller board 200.

In step S1011, the CPU 201 performs a normal version upgrade process. The normal version upgrade process refers to a version upgrade process involving a restart. More specifically, the CPU 201 acquires firmware, which is subjected to a version upgrade, and performs a version upgrade process involving a restart. The firmware, which is subjected to a version upgrade, acquired by the CPU 201 is used as update firmware for updating firmware. The CPU 201 may acquire the firmware, which is subjected to a version upgrade, from the computer 108 or a management server apparatus via the LAN or network 107, or from the USB memory 209.

In step S1003, the CPU 201 determines whether there is version upgrade data for the main controller board 200. If the CPU 201 has determined that there is the version upgrade data, the processing proceeds to step S1004. If, on the other hand, the CPU 201 has determined in step S1003 that there is no such version upgrade data, the processing proceeds to step S1009. In the present exemplary embodiment, the firmware of the main controller board 200 refer to the pieces of firmware 501 and 502. The pieces of firmware 501 and 502 are pieces of firmware before being subjected to version upgrades.

The process of step S1003 is described more specifically.

If the CPU 201 has acquired the version upgrade information illustrated in FIG. 7B, the pieces of firmware 611 and 612 of the main controller board 200 are not subjected to version upgrades. In such a case, the CPU 201 determines that there is no version upgrade data for the main controller board 200. If, on the other hand, the CPU 201 has acquired the version upgrade information in FIG. 7C or 7D, the pieces of firmware 621, 622, 631, and 632 of the main controller board 200 are subjected to version upgrades. In such a case, the CPU 201 determines that there is version upgrade data for the main controller board 200.

In step S1009, the CPU 201 executes a sleep version upgrade, and the processing proceeds to step S1010. The details of the sleep version upgrade process performed by the CPU 201 will be described later with reference to FIG. 8.

In step S1010, the CPU 201 returns the MFP 100 from the sleep mode using the firmware of which the version upgrade is executed in step S1009. The version upgraded firmware is reflected on the MFP 100 by the process of step S1010.

In step S1004, the CPU 201 determines whether it is possible to perform individual version upgrades of the pieces of firmware of the main controller board 200. If the CPU 201 has determined that it is possible to perform individual version upgrades of the pieces of firmware of the main controller board 200 (YES in step S1004), the processing proceeds to step S1005. If, on the other hand, the CPU 201 has determined NO in step S1004, the processing proceeds to step S1008.

The process of step S1004 is described more specifically.

In the version upgrade information illustrated in FIG. 7C, the version upgrade information of the main controller board 200 and the version upgrade information of other than the main controller board 200 are managed together. This means that the pieces of firmware 621, 622, 623, 624, and 625 of the main controller board 200, the sub controller board 220, the scanner device 101, and the printer device 102 are related to one another. Thus, if having acquired the version upgrade information illustrated in FIG. 7C, the CPU 201 determines that it is not possible to perform individual version upgrades of the pieces of firmware of the main controller board 200. In the version upgrade information illustrated in FIG. 7D, on the other hand, the version upgrade information of the main controller board 200 and the version upgrade information of other than the main controller board 200 are managed separately. This means that the pieces of firmware 631 and 632 of the main controller board 200 are not related to the pieces of firmware 633, 634, and 635 of other than the main controller board 200. Thus, if having acquired the version upgrade information illustrated in FIG. 7D, the CPU 201 determines that it is possible to perform individual version upgrades of the pieces of firmware of the main controller board 200.

In step S1008, the CPU 201 performs a normal version upgrade process. The details of the normal version upgrade process are similar to step S1011 and therefore are not described.

In step S1005, if the CPU 201 has acquired the version upgrade information illustrated in FIG. 7D in step S1000, the CPU 201 executes sleep version upgrades using the pieces of firmware 633, 634, and 635 of other than the main controller board 200, and the processing proceeds to step S1006. Similarly to step S1009, the details of the sleep version upgrade process will be described later with reference to FIG. 8.

In step S1006, the CPU 201 returns the MFP 100 from the sleep mode using the firmware of which the version upgrade is executed in step S1005, and the processing proceeds to step S1007. The version upgraded firmware is reflected on the MFP 100 by the process of step S1006.

In step S1007, the CPU 201 performs a normal version upgrade process in version upgrades for the remaining pieces of firmware 631 and 632 of the main controller board 200, and the processing ends. The details of the normal version upgrade process are similar to steps S1008 and S1011 and therefore are not described.

Next, with reference to FIG. 8, the sleep version upgrade process of firmware performed by the MFP 100 is described.

FIG. 8 is a flow chart illustrating an example of the processing performed by the MFP 100 in the sleep version upgrade of firmware.

In step S1100, the CPU 201 determines whether there is version upgrade data for a controller board or an image engine having no dedicated ROM. If the CPU 201 has determined that there is the version upgrade data, the processing proceeds to step S1101. If, on the other hand, the CPU 201 has determined in step S1100 that there is no version upgrade data, the processing proceeds to step S1102. In the present exemplary embodiment, the sub controller board 220 corresponds to a controller board or an image engine having no dedicated ROM.

If the CPU 201 has acquired the version upgrade information illustrated in FIG. 7B, the firmware 613 of the sub controller board 220 is subjected to a version upgrade. In such a case, the CPU 201 determines that there is version upgrade data for the firmware of a controller board or an image engine having no dedicated ROM. If, on the other hand, the CPU 201 has acquired the version upgrade information illustrated in FIG. 7E, the firmware 643 of the sub controller board 220 is not subjected to a version upgrade. In such a case, the CPU 201 determines that there is no version upgrade data for the firmware of a controller board or an image engine having no dedicated ROM.

If the CPU 201 has acquired the version upgrade information illustrated in FIG. 7B, in step S1101, the CPU 201 instructs the CPU 221 of the sub controller board 220 to perform a version upgrade of the firmware, and the processing proceeds to step S1102.

More specifically, the CPU 221 overwrites the firmware 415 of the sub controller board 220 using a new version, namely the firmware 613, in the background during the operation of the MFP 100. The sub controller board 220 starts by the CPU 201 transferring the firmware 415 to the sub controller board 220, and therefore, the firmware 415 that is being used for the operation has been developed in the memory 223. This enables the CPU 221 to overwrite the firmware 415. The CPU 201 may acquire the firmware, which is subjected to a version upgrade, from the computer 108 or a management server apparatus via the LAN or network 107, or from the USB memory 209.

In step S1102, based on an instruction received via an input from the user through the operation unit 103, the CPU 201 instructs the MFP 100 to shift to the sleep mode, and the processing proceeds to step S1103. The processing of the instruction given by the CPU 201 to shift to the sleep mode does not need to be limited to this. For example, the case where a time specified in advance has come or the case where a job has not been executed for a certain time period or longer may be defined as a shifting condition for shifting to the sleep mode. Detection by the CPU 201 that the shifting condition has been satisfied may be used as the instruction to shift to the sleep mode in step S1102.

In step S1103, the CPU 201 determines whether there is version upgrade data for a controller board or an image engine having a dedicated ROM. If the CPU 201 has determined that there is version upgrade data, the processing proceeds to step S1104. If, on the other hand, the CPU 201 has determined in step S1103 that there is no version upgrade data, the processing proceeds to step S1105. In the present exemplary embodiment, the printer device 102 and the scanner device 101 correspond to a controller board or an image engine having a dedicated ROM.

If the CPU 201 has acquired the version upgrade information illustrated in FIG. 7B, the pieces of firmware 615 and 614 of the printer device 102 and the scanner device 101, respectively, are not to be used for version upgrades. In such a case, the CPU 201 determines that there is no version upgrade data for the firmware of a controller board or an image engine having a dedicated ROM. If the CPU 201 has acquired the version upgrade information illustrated in FIG. 7E, the firmware 644 of the scanner device 101 is subjected to a version upgrade. In such a case, the CPU 201 determines that there is version upgrade data for the firmware of a controller board or an image engine having a dedicated ROM.

In step S1104, the CPU 201 shows the user as if the MFP 100 has shifted to the sleep mode, and the CPU 201 performs the version upgrade in the background. Then, upon completion of the version upgrade, the processing proceeds to step S1005.

The process of step S1104 is described more specifically.

The CPU 201 continues to supply power to the main controller board 200, and the CPU 201 turns off the on/off switching units 316, 317, and 318 of the controller board or the image engines, which is or are not subjected to version upgrades. Further, the CPU 201 operates the on/off switching units 316, 317, and 318 with respect to the controller board or the image engines, which is or are subjected to version upgrades, thereby causing the controller board or the image engines to restart in a version upgrade mode. Further, when performing the process of step S1104, the CPU 201 shows the user as if the MFP 100 has shifted to the sleep mode by displaying a screen on which the user cannot perform a screen input through the operation unit 103. For example, when performing the process of step S1104, the CPU 201 may display nothing on the screen of the operation unit 103, may indicate on the screen that it is not possible to perform an input operation, or may indicate on the screen that a version upgrade is being performed. These screen display processes are examples of the process of providing screen display.

If the CPU 201 has acquired the version upgrade information illustrated in FIG. 7E, the CPU 201 turns off the on/off switching unit 317 of the printer device 102. In the present exemplary embodiment, the scanner device 101, which is subjected to a version upgrade, is connected to the far end of the sub controller board 220 with respect to the CPU 201 of the main controller board 200, which gives an instruction to perform the version upgrade. Thus, the CPU 201 needs to control so that power is supplied to the sub controller board 220 as well. Then, to perform the version upgrade of the firmware of the scanner device 101, the CPU 201 operates the on/off switching unit 318, thereby causing the scanner device 101 to restart in a mode after the version upgrade. The CPU 241 of the scanner device 101 performs the version upgrade of the firmware 504 stored in the ROM 242 of the scanner device 101 to the firmware 644.

Meanwhile, the components other than the main controller board 200 are not being supplied with power, or are in the process of firmware version upgrade. However, the CPU 201 of the main controller board 200, which receives a job, is being supplied with power as usual. Therefore, the CPU 201 can receive a job via the NIC 211 or the operation unit 103.

When having received a job via the NIC 211 or the operation unit 103, the CPU 201 executes the job if the CPU 201 can execute the job, or the CPU 201 stores the content of the job in the HDD 104 if the CPU 201 cannot execute the job. For example, when having received a print job from the NIC 211, the CPU 201 can execute the job if the printer device 102 is not being subjected to a version upgrade. Thus, the CPU 201 executes the job. If, however, the printer device 102 is being subjected to a version upgrade, the CPU 201 temporarily stores the content of the job in the HDD 104. Then, the CPU 201 executes the job stored in the HDD 104 after the version upgrade of the printer device 102 has ended.

In step S1105, the CPU 201 instructs the MFP 100 to shift to the sleep mode, and the processing proceeds to step S1106. More specifically, if the version upgrade of the firmware has ended or if there is no firmware to be subjected to a version upgrade, the CPU 201 turns off the on/off switching units 312, 316, 317, and 318 and instructs the MFP 100 to shift to the sleep mode. For example, if the CPU 201 has acquired the version upgrade information illustrated in FIG. 7E, the CPU 201 turns off the on/off switching units 316 and 318 so that the power supply to the sub controller board 220 and the scanner device 101 is stopped. Then, to reduce power consumption, the CPU 201 also turns off the on/off switching unit 312 so that the power supply to the main controller board 200 is stopped. If, however, intending only to perform the version upgrade of the firmware described above, the CPU 201 may not need to turn off the on/off switching unit 312 so that the power supply to the main controller board 200 is stopped. Alternatively, the power state in this case may be the sleep mode.

In step S1106, the CPU 201 acquires a wake-up trigger for a return from the sleep mode, and the processing ends. As described above with reference to FIG. 3, power is being supplied to the NIC 211, the memory 203, and a part of the operation unit 103 through other channels even in the sleep mode. Thus, the MFP 100 can return from the sleep mode using a job or an operation command received via the NIC 211, or an instruction received from the user through the operation unit 103 as a wake-up trigger for a return. More specifically, when the MFP 100 returns from the sleep mode, the trigger detection unit 311 detects and analyzes the input of data from the operation unit 103 or the NIC 211, and turns on the on/off switching unit 312. Further, the CPU 201 determines the switching of the on/off switching units 316, 317, and 318 of the sub controller board 220, the printer device 102, and the scanner device 101, respectively, and turns on the on/off switching units 316, 317, and 318, thereby returning the MFP 100 from the sleep mode.

As described above, according to the present exemplary embodiment, the CPU 201 of the main controller board 200 controls on/off switching units, whereby the MFP 100 can perform an individual version upgrade of firmware. This enables the MFP 100 to perform a version upgrade process without rebooting the entire MFP 100. Thus, even during the execution of a version upgrade of firmware, the MFP 100 can receive a job from the computer 108 via a network.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-268495 filed Dec. 7, 2012, which is hereby incorporated by reference herein in its entirety.

What is claimed is:

1. An image processing apparatus comprising a main control unit and a sub control unit, the image processing apparatus comprising:
a power control unit configured to control the image processing apparatus operating in either of a first power mode or a second power mode, wherein the main control unit is operative to receive a job transmitted from an external apparatus and power is supplied to the sub control unit in the first power mode, and the main control unit is operative to receive a job transmitted from an external apparatus and power is not supplied to the sub control unit in the second power mode;
an update unit configured to update firmware of the image processing apparatus;
a specifying unit configured to specify firmware subject to update;
a detection unit configured to detect in a case where a shifting condition for shifting from the first power mode to the second power mode is satisfied;
wherein the update unit updates firmware of the sub control unit according to the detection unit having detected that the shifting condition is satisfied, if the firmware subject to update specified by the specifying unit is not firmware of the main control unit but firmware of the sub control unit; and wherein the power control unit causes the image processing apparatus to shift from the first power mode to the second power mode according to completion of the update of the firmware of the sub control unit performed by the update unit if the firmware subject to update specified by the specifying unit is not firmware of the main control unit but firmware of the sub control unit.

2. The image processing apparatus according to claim 1, wherein the update unit updates the firmware subject to update, and the image processing apparatus restarts according to completion of the update of the firmware subject to update if the firmware subject to update specified by the specifying unit includes firmware of the main control unit.

3. The image processing apparatus according to claim 1, wherein the power control unit supplies power to the main control unit whether the image processing apparatus is in the first power mode or the second power mode.

4. The image processing apparatus according to claim 1, further comprising an acquisition unit configured to acquire update information regarding the update of the firmware of the image processing apparatus, and wherein the specifying unit specifies firmware subject to update based on the update information acquired by the acquisition unit.

5. The image processing apparatus according to claim 4, wherein the acquisition unit further acquires update firmware for updating the firmware of the image processing apparatus, and wherein the update unit updates firmware based on the update firmware acquired by the acquisition unit.

6. A method for controlling an image processing apparatus comprising a main control unit and a sub control unit and capable of operating in either of a first power mode or a second power mode, wherein the main control unit is operative to receive a job transmitted from an external apparatus and power is supplied to the sub control unit in the first power mode, and the main control unit is operative to receive a job transmitted from an external apparatus and power is not supplied to the sub control unit in the second power mode, the method comprising:

specifying firmware subject to update;

updating firmware of the sub control unit according to a detection in a case where a shifting condition for shifting from the first power mode to the second power mode has been satisfied if the specified firmware to be updated is not firmware of the main control unit but firmware of the sub control unit; and causing the image processing apparatus to shift from the first power mode to the second power mode according to completion of the update of the firmware of the sub control unit.

7. A non-transitory computer readable storage medium storing a program that causes a computer to execute the method according to claim 6.

8. An image processing apparatus including a first controller and a second controller, the image processing apparatus further comprises:

an update unit configured to update firmware of the image processing apparatus;

a specifying unit configured to specify the firmware to be updated; and a detection unit configured to detect that the image processing apparatus has satisfied a shifting condition for shifting from a first power mode in which power is supplied to both of the first and second controllers to a second power mode in which power is supplied to the first controller and is not supplied to the second controller;

wherein in a case where the specified firmware to be updated is not firmware of the first controller, but is firmware of the second controller, the update unit is configured to update the firmware of the second controller in response to the detection unit detecting that the image processing apparatus has satisfied the shifting condition; and wherein in a case where the specified firmware to be updated includes firmware of the first controller, the update unit is configured to execute update of firmware accompanied by a restart of the image processing apparatus.

9. The image processing apparatus according to claim 8, in a case where the specified firmware to be updated is not firmware of the first controller, but firmware of the second controller, the image processing apparatus is configured to shift to the second power mode in response to update of the firmware of the second controller having been completed.

10. A method for controlling an image processing apparatus comprising a first controller and a second controller, comprising:

updating firmware of the image processing apparatus;

specifying the firmware to be updated;

detecting whether the image processing apparatus has satisfied a shifting condition for shifting from a first power mode to a second power mode, wherein the power is supplied to both the first and second controllers in the first power mode, and power is supplied to the first controller and not to the second controller in the second mode;

wherein in a case where the firmware is specified to be firmware of the second controller and not of the first controller, updating the firmware of the second controller in response to detection that the image processing apparatus has satisfied the shifting condition; and wherein in a case where the firmware id specified to be firmware of the first controller, executing update of the firmware accompanied by a restart of the image processing apparatus.

11. A non-transitory computer readable storage medium storing a program that causes a computer to execute the method according to claim 10.

* * * * *